(12) United States Patent
Murata

(10) Patent No.: US 11,556,308 B2
(45) Date of Patent: Jan. 17, 2023

(54) INFORMATION PROCESSING SYSTEM, INFORMATION PROCESSING APPARATUS INCLUDING CIRCUITRY TO STORE POSITION INFORMATION OF USERS PRESENT IN A SPACE AND CONTROL ENVIRONMENT EFFECT PRODUCTION, INFORMATION PROCESSING METHOD, AND ROOM

(71) Applicant: Ricoh Company, Ltd., Tokyo (JP)

(72) Inventor: Haruki Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/174,390

(22) Filed: Feb. 12, 2021

(65) Prior Publication Data
US 2021/0263704 A1   Aug. 26, 2021

(30) Foreign Application Priority Data
Feb. 26, 2020 (JP) .............................. JP2020-030869

(51) Int. Cl.
*G06F 3/16* (2006.01)
*H04W 4/029* (2018.01)
(Continued)

(52) U.S. Cl.
CPC .............. *G06F 3/167* (2013.01); *G10L 17/06* (2013.01); *G10L 17/22* (2013.01); *G10L 25/51* (2013.01); *H04W 4/029* (2018.02)

(58) Field of Classification Search
CPC ........ G06F 3/167; H04W 4/029; G10L 17/06; G10L 17/22; G10L 25/51; G10L 17/26
See application file for complete search history.

(56) References Cited

U.S. PATENT DOCUMENTS 9,544,158 B2 * 1/2017 Kotler ................. H04L 65/4023
9,621,795 B1 * 4/2017 Whyte ................... H04R 3/005
(Continued)

FOREIGN PATENT DOCUMENTS

JP   2016-032205   3/2016
JP   2016-178487   10/2016
(Continued)

*Primary Examiner* — Afroza Chowdhury
(74) *Attorney, Agent, or Firm* — Xsensus LLP

(57) ABSTRACT

An information processing system includes: an image display apparatus provided in a space and configured to display an image; a sensor apparatus carried by a user who is present in the space and configured to output a signal for detecting position information of the user in the space; and an information processing apparatus. The information processing apparatus includes circuitry configured to store a plurality of pieces of position information of a plurality of users including the user, who are in present in the space, in association with the plurality of users, the plurality of users being detected based on signals output from a plurality of sensor apparatuses including the sensor apparatus, and control environment effect production that supports communication between the plurality of users by the image displayed by the image display apparatus, based on each of the plurality of pieces of position information of the plurality of users.

15 Claims, 16 Drawing Sheets

(51) Int. Cl.
*G10L 17/22* (2013.01)
*G10L 17/06* (2013.01)
*G10L 25/51* (2013.01)

(56) References Cited

U.S. PATENT DOCUMENTS

| | | | | |
|---|---|---|---|---|
| 2009/0058611 | A1* | 3/2009 | Kawamura | H04W 4/023 |
| | | | | 704/E11.001 |
| 2013/0120522 | A1* | 5/2013 | Lian | H04N 7/15 |
| | | | | 348/E7.083 |
| 2013/0216206 | A1* | 8/2013 | Dubin | H04N 7/155 |
| | | | | 386/282 |
| 2015/0053016 | A1* | 2/2015 | Sleator | G01H 9/00 |
| | | | | 73/655 |
| 2018/0039386 | A1* | 2/2018 | Nishiyama | G06F 3/013 |
| 2019/0069379 | A1* | 2/2019 | Kastee | H05B 45/12 |
| 2019/0073103 | A1* | 3/2019 | Gunderson | G06F 3/0481 |
| 2021/0037068 | A1* | 2/2021 | Shelke | H04L 65/1093 |

FOREIGN PATENT DOCUMENTS

| | | |
|---|---|---|
| JP | 2019-072114 | 5/2019 |
| JP | 2019-097796 | 6/2019 |

\* cited by examiner

FIG. 7A
VIDEO DISPLAY APPARATUS INFORMATION STORAGE UNIT

| VIDEO DISPLAY APPARATUS ID | PROJECTION RANGE (WALL) | PROJECTION RANGE (FLOOR) |
|---|---|---|
| PJ1 | (x11,y11)~(x12,y12),··· | — |
| PJ2 | (x21,y21)~(x22,y22),··· | — |
| PJ3 | — | (x31,y31)~(x32,y32),··· |
| PJ4 | — | (x41,y41)~(x42,y42),··· |
| ··· | ··· | ··· |

FIG. 7B
USER INFORMATION STORAGE UNIT

| USER ID | TAG ID | POSITION INFORMATION | SPEECH STATE |
|---|---|---|---|
| userA | 111 | (x1,y1) | True |
| userB | 222 | (x2,y2) | False |
| userC | 333 | (x3,y3) | False |
| userD | 444 | (x4,y4) | False |
| ··· | ··· | ··· | ··· |

FIG. 7C
LOG STORAGE UNIT

| DATE AND TIME | USER ID | TAG ID | POSITION INFORMATION | SPEECH STATE | SPEECH VOLUME |
|---|---|---|---|---|---|
| 2020/02/19 17:00 | userA | 111 | (x1,y1) | True | HIGH |
| 2020/02/19 17:00 | userB | 222 | (x2,y2) | False | NONE |
| 2020/02/19 17:01 | userA | 111 | (x11,y11) | True | MEDIUM |
| 2020/02/19 17:01 | userB | 222 | (x22,y22) | False | NONE |
| 2020/02/19 17:01 | userC | 333 | (x3,y3) | False | NONE |
| ··· | ··· | ··· | ··· | ··· | ··· |
| ··· | ··· | ··· | ··· | ··· | ··· |

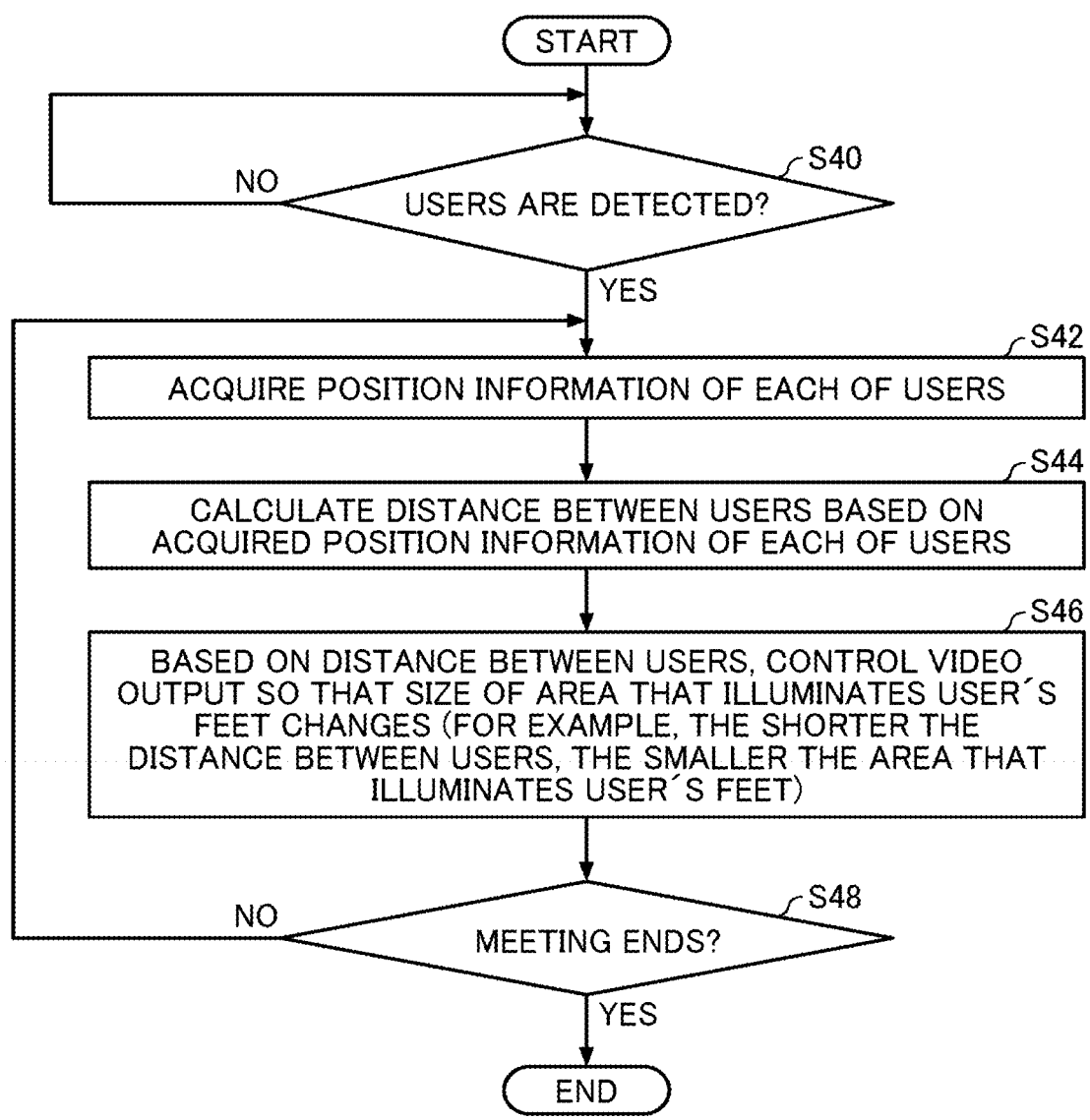

INFORMATION PROCESSING SYSTEM, INFORMATION PROCESSING APPARATUS INCLUDING CIRCUITRY TO STORE POSITION INFORMATION OF USERS PRESENT IN A SPACE AND CONTROL ENVIRONMENT EFFECT PRODUCTION, INFORMATION PROCESSING METHOD, AND ROOM

CROSS-REFERENCE TO RELATED APPLICATION

This patent application is based on and claims priority pursuant to 35 U.S.C. § 119(a) to Japanese Patent Application No. 2020-030869, filed on Feb. 26, 2020, in the Japan Patent Office, the entire disclosure of which is hereby incorporated by reference herein.

BACKGROUND

Technical Field

The present disclosure relates to an information processing system, an information processing apparatus, an information processing method, and a room.

Related Art

In meetings or presentations conducted in offices, a technique is known that prepares an environment in which video is projected by using various devices such as a lighting device, a projector, a retractable screen, and a blind, while saving users from complicated operations.

The spread of cloud computing in recent years enables users to use remote conference services, for example. The remote conference service enables users to hold a remote conference with users in different places while saving transportation cost and travel time. The use of such remote conference is expected to increase in the future.

Therefore, a meeting held by users who gather in real in the same place is required to provide a different value from the remote conference.

SUMMARY

An information processing system includes: an image display apparatus provided in a space and configured to display an image; a sensor apparatus carried by a user who is present in the space and configured to output a signal for detecting position information of the user in the space; and an information processing apparatus communicably connected to the image display apparatus and the sensor apparatus. The information processing apparatus includes circuitry configured to store a plurality of pieces of position information of a plurality of users including the user, who are in present in the space, in association with the plurality of users, the plurality of users being detected based on signals output from a plurality of sensor apparatuses including the sensor apparatus, each being carried by each of the plurality of users, and control environment effect production that supports communication between the plurality of users by the image displayed by the image display apparatus, based on each of the plurality of pieces of position information of the plurality of users.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A to 7C are illustrations of examples of data structures of tables used in the information processing system, according to an embodiment of the present disclosure;

FIG. 13 is a flowchart illustrating an example of steps in the spotlight processing according to a distance between users, according to an embodiment of the present disclosure;

Figure 1:
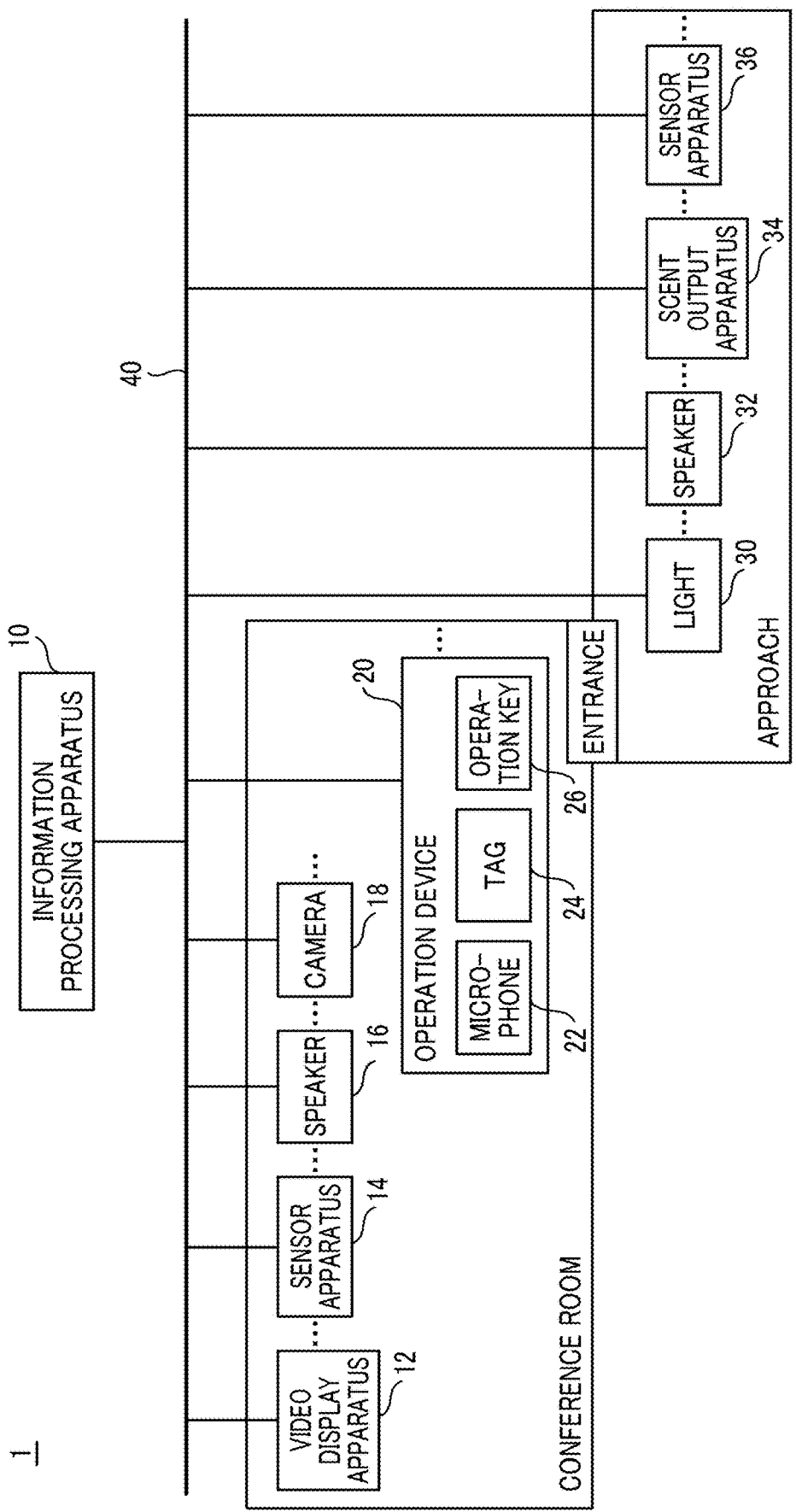
FIG. 1 is a schematic diagram illustrating an example of an information processing system, according to an according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of several embodiments of the present disclosure with reference drawings. Although in the embodiments, a description is given of an example in which a space where plural users gather is a conference room, the conference room is just one example. The embodiments are applicable to various spaces such as a room in which seminars and lectures are held, and a meeting space. In this description, the room is an example of a space defined by one or more faces.

First Embodiment

System Configuration

Figure 2:
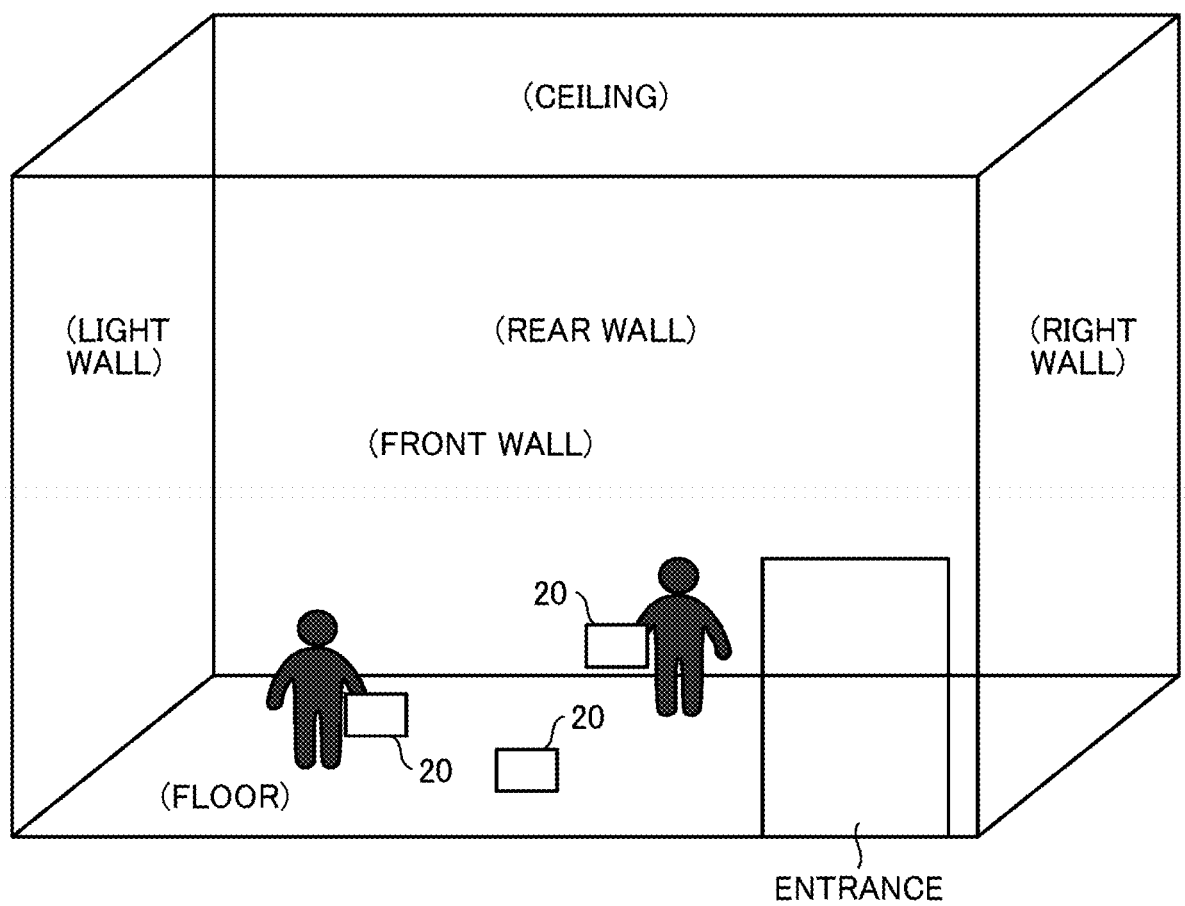
FIG. 2 is an illustration for describing an example of a conference room, according to an embodiment of the present disclosure.

FIG. 1 is a schematic diagram illustrating a configuration of an information processing system according to the present embodiment. FIG. 2 is an illustration for describing an example of a conference room according to the present embodiment. The information processing system 1 of FIG. 1 includes an information processing apparatus 10, a video display apparatus 12, a sensor apparatus 14, a speaker 16, a camera 18, an operation device 20, a light 30, a speaker 32, a scent output apparatus 34, and a sensor apparatus 36, which are communicably connect to one another wired or wirelessly through a network 40 such as the Internet of a local area network (LAN). The operation device 20 includes a microphone 22, a tag 24, and an operation key 26. A plurality of types of operation devices 20 having different shapes and functions can be provided in the conference room. For example, the operation device 20 may include a touch panel, a gyroscopic sensor, a tactile sensor, and the like. Further, the operation devices 20 may have different sizes and texture.

The video display apparatus 12, the sensor apparatus 14, the speaker 16, the camera 18, and the operation device 20 are provided in the conference room. The light 30, the speaker 32, the scent output apparatus 34, and the sensor apparatus 36 are provided in an approach, which is a space where a user passes through before entering the conference room. Although FIG. 1 illustrates an example in which the information processing apparatus 10 is provided outside the conference room, in another example, the information processing apparatus 10 is provided inside the conference room.

The sensor apparatus 36 provided in the approach receives a transmission beacon (radio wave) transmitted from a tag of a user who is passing through the approach as a signal for detecting position information of the user. The sensor apparatus 36 transmits the received signal to the information processing apparatus 10. The light 30 provided in the approach outputs light under control of the information processing apparatus 10. The speaker 32 provided in the approach outputs sound under control of the information processing apparatus 10. The scent output apparatus 34 provided in the approach outputs an odor under control of the information processing apparatus 10.

The information processing apparatus 10 detects the position information of the user based on the signal transmitted from the sensor apparatus 36. Further, based on the position information of the user, the information processing apparatus 10 performs an approach effect producing process, which resets the user's feelings with light, sound, and scent. It is preferable that the approach is wide enough to allow only one person to pass through, so that a user who enters or leaves the conference room restore his/her private feelings. The approach effect producing process performed when the user enters the conference room and the approach effect producing process performed when the user leaves the conference room may be different from each other.

The sensor apparatus 14 provided in the conference room receives radio waves transmitted from a tag of a user who is in the conference room as a signal for detecting position information of the user. The sensor apparatus 14 transmits the received signal to the information processing apparatus 10. The sensor apparatus 14 can be any sensor of a positioning system, provided that the sensor can outputs a signal for detecting the position information of the information. For example, the sensor apparatus 14 supports a target to be measured, such as a dedicated tag, a smartphone, or various types of Bluetooth Low Energy (BLE) sensors. The information processing apparatus 10 detects the position information of each of users in the conference room based on the signal for detecting the position information of each of the users transmitted from one or more sensor apparatuses 14.

The operation device 20 in the conference room is an example of the target to be measured by the positioning system. For example, the sensor apparatus 14 in the conference room receives radio waves transmitted from the tag 24 of the operation device 20 and transmits the received radio waves to the information processing apparatus 10. Thus, as illustrated in FIG. 1, for example, the sensor apparatus 14 notifies the information processing apparatus 10 of the signal for detecting the position information in the conference room of each user carrying the operation device 20. The tag 24 built in the operation device 20 is just one example. The tag 24 can be provided in any other suitable form.

The camera 18 in the conference room photographs the conference room and transmits the captured video data to the information processing apparatus 10. As the camera 18, the Kinect (registered trademark) video camera can be used, for example. When Kinect (registered trademark) is used as the camera 18, the movement and posture of the user are recognized based on the combination of a posture recognition technology and detection results of a distance image sensor, an infrared sensor, and an array microphone. The posture recognition technology is a technology for predicting what kind of posture the user is in.

The plurality of video display apparatuses 12 in the conference room are projectors, which display images on walls (front wall, rear wall, right wall, left wall, etc.) and a floor, each being an example of a face partitioning the conference room as illustrated in FIG. 2 under control of the information processing apparatus 10. By using the plurality of video display apparatuses 12, videos are projected onto the entire walls and floor of the conference room. In another example, the plurality of video display apparatuses 12 in the conference room are display apparatuses embedded in the walls and floor of the conference room. By using the display apparatuses embedded in the walls and floor, videos are displayed to the walls and floor of the conference room. Hereinafter, a description is given of an example in which the video display apparatus 12 is a projector. The speaker 16 in the conference room outputs sound under control of the information processing apparatus 10. The shape of the conference room illustrated in FIG. 2 is just an example, and the conference room can have any other suitable shape. In addition, not all of the faces of the conference rooms are necessarily partitioned by walls, a floor, and a ceiling. The conference room can have an open space, which has a part that is not partitioned by a face. In this description, the video display apparatus 12 is an example of an image display apparatus that can display still images and movie images.

The operation device 20 is used while being held by the user, for example. In another example, the operation device 20 is a wearable device, which is used while being worn by the user, such as a smartwatch or smartglasses. The microphone 22 of the operation device 20 converts the user's voice into electrical signals. The tag 24 is an example of the target to be measured by the positioning system. The operation key 26 receives a user's operation. The operation device 20 transmits the electric signals converted from the user's voice to the information processing apparatus 10 as output signals. The operation device 20 transmits the user's operation received by the operation key 26 to the information processing apparatus 10 as operation signals.

Based on the user's position information detected by the signal transmitted from the sensor apparatus 14, the output signals from the microphone 22 of the operation device 20, and the operation signals corresponding to the user's operation received from the operation key 26 of the operation device 20, the information processing apparatus 10 performs an environment effect producing process as described below that supports communication among a plurality of users in the same space, to improve the teamwork of the users in the conference room.

Further, for example, the information processing apparatus 10 supports a team to conceive an idea by controlling the environment effect producing process (spatial environment setting process) described below. The information processing system 1 according to the present embodiment improves the teamwork of a plurality of users in the conference room by controlling an environmental effect by video and sound as described below. Further, the information processing apparatus 10 achieves both maximization of individual creativity and realization of diversity by team's work by the environment effect producing process described below. For example, the information processing apparatus 10 supports an individual to bring various idea by stimulating the individual's brain by the environment effect producing process described below, thereby improving the quality of ideas.

The conference room controllable by the environment effect producing process described below is a space that implements, by digital environment production (environment effect), an effect that a user is supported to bring ideas or an effect that communication is promoted, such effect being brought about when a user drinks alcohol and gets drunk, and his or her feelings are elevated, for example. Such a space may be referred to as a "digital alcohol space" hereinafter. The digital alcohol space is a space that maximizes the teamwork created by gathering individuals (users) and turns the teamwork into creative motivation. In addition, the digital alcohol space not only improves the efficiency of work itself, but also improves the emotions and motivation of a person who works by the environment effect, thereby supporting creation.

The configuration of the information processing system 1 illustrated in FIG. 1 is just an example. For example, the information processing apparatus 10 can be implemented by a single computer or a plurality of computers, or can be implemented by using a cloud service. Examples of the information processing apparatus 10 include, but not limited to, an output device such as a projector (PJ), an interactive whiteboard (IWB; an electronic whiteboard having mutual communication capability), and a digital signage, a head-up display (HUD), an industrial machine, an imaging device, a sound collecting device, a medical device, a networked home appliance, an automobile (connected car), a laptop computer (PC), a mobile phone, a smartphone, a tablet terminal, a game console, a personal digital assistant (PDA), a digital camera, a wearable PC and a desktop PC.

Hardware Configuration

Computer

Figure 3:
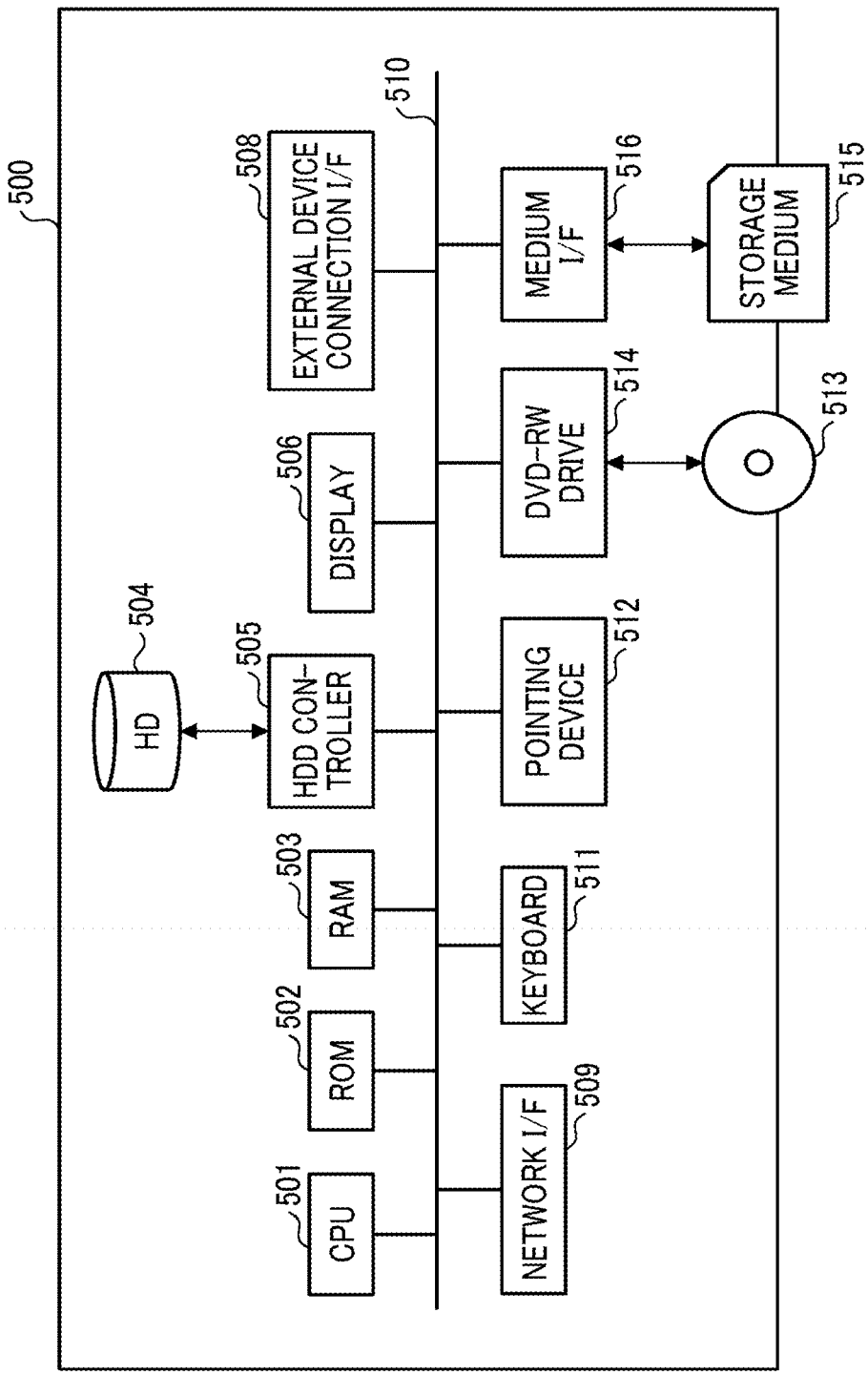
FIG. 3 is a block diagram illustrating an example of a hardware configuration of a computer, according to an embodiment of the present disclosure.

The information processing apparatus 10 is implemented by, for example, a computer 500 having a hardware configuration as illustrated in FIG. 3.

FIG. 3 is a block diagram illustrating an example of a hardware configuration of the computer 500, according to the present embodiment. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, and a display 506, an external device connection interface (I/F) 508, a network I/F 509, a data bus 510, a keyboard 511, a pointing device 512, a digital versatile disk rewritable (DVD-RW) drive 514, and a medium I/F 516.

Among these elements, the CPU 501 controls entire operation of the computer 500. The ROM 502 stores programs such as an initial program loader (IPL) to boot the CPU 501. The RAM 503 is used as a work area for the CPU 501. The HD 504 stores various data such as a control program. The HDD controller 505 controls reading or writing of various data from or to the HD 504 under control of the CPU 501.

The display 506 displays various information such as a cursor, menu, window, character, or image. The external device connection I/F 508 is an interface that connects the computer 500 to various external devices. Examples of the external devices include, but not limited to, a universal serial bus (USB) memory and a printer. The network I/F 509 is an interface for performing data communication using the network 40. Examples of the data bus 510 include, but not limited to, an address bus and a data bus, which electrically connects the components such as the CPU 501 with one another.

The keyboard 511 is one example of an input device provided with a plurality of keys that allows a user to input characters, numerals, or various instructions. The pointing device 512 is an example of an input device that allows a user to select or execute a specific instruction, select a target for processing, or move a cursor being displayed. The DVD-RW drive 514 controls reading or writing of various data from or to a DVD-RW 513, which is an example of a removable storage medium. The removable storage medium is not limited to the DVD-RW and may be a digital versatile disk-recordable (DVD-R) or the like. The medium I/F 516 controls reading or writing (storing) of data from and to a storage medium 515 such as a flash memory.

Smartphone

Figure 4:
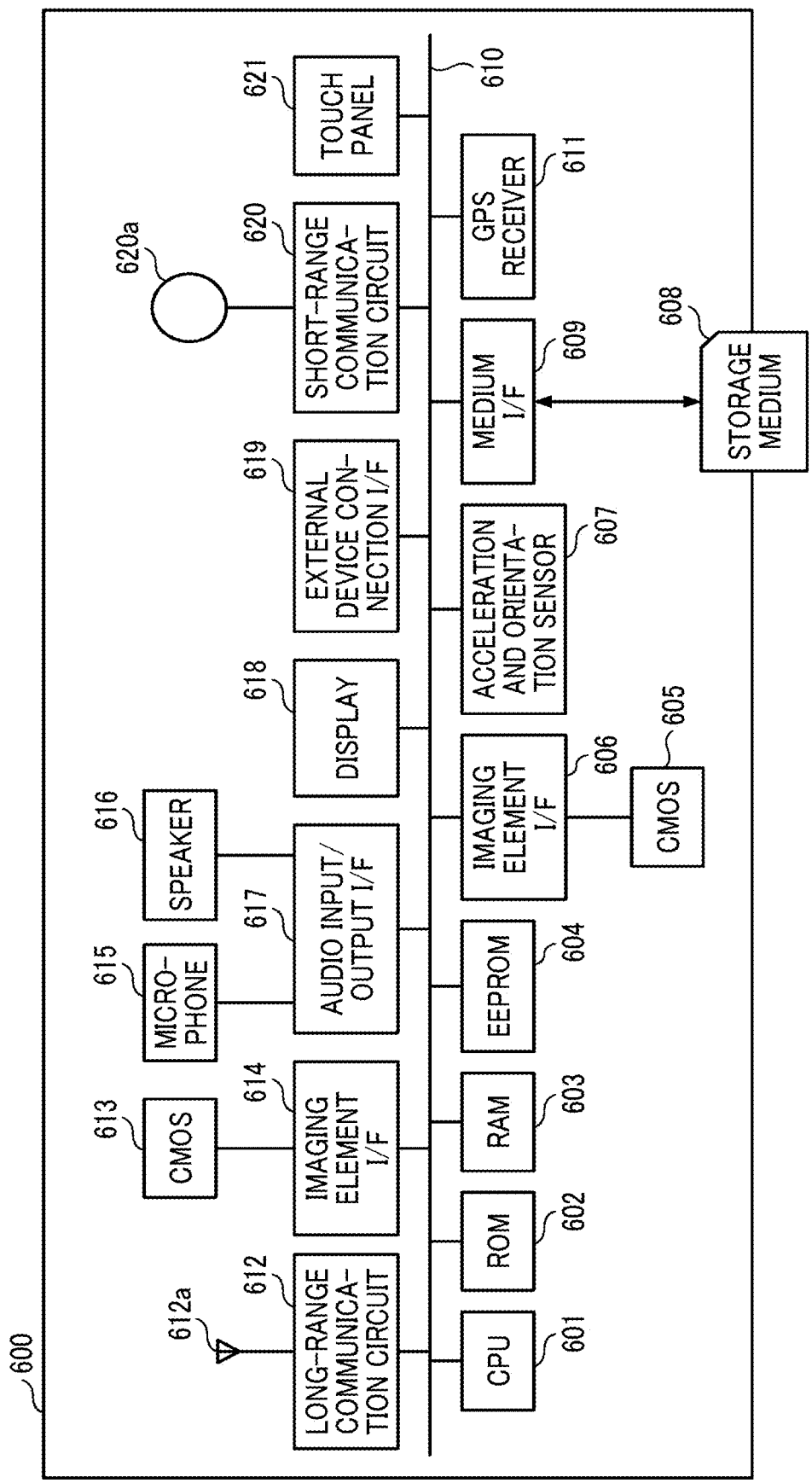
FIG. 4 is a block diagram illustrating an example of a hardware configuration of a smartphone, according to an embodiment of the present disclosure.

The operation device 20 can be implemented by, for example, a smartphone 600 having a hardware configuration as illustrated in FIG. 4.

FIG. 4 is a block diagram illustrating an example of a hardware configuration of the smartphone 600, according to the present embodiment. As illustrated in FIG. 4, the smartphone 600 includes a CPU 601, a ROM 602, a RAM 603, an electrically erasable and programmable ROM (EEPROM) 604, a complementary metal oxide semiconductor (CMOS) sensor 605, an imaging element I/F 606, an acceleration and orientation sensor 607, a medium I/F 609, and a global positioning system (GPS) receiver 611.

The CPU 601 controls entire operation of the smartphone 600. The ROM 602 stores programs such as an IPL to boot the CPU 601. The RAM 603 is used as a work area for the CPU 601. The EEPROM 604 reads or writes various data such as a control program for a smartphone under control of the CPU 601.

The CMOS sensor 605 is an example of a built-in imaging device configured to capture an object (mainly, a self-image of a user operating the smartphone 600) under control of the CPU 601 to obtain image data. In alternative to the CMOS sensor 605, an imaging element such as a charge-coupled device (CCD) sensor can be used. The imaging element I/F 606 is a circuit that controls driving of the CMOS sensor 605. Examples of the acceleration and orientation sensor 607 include, but not limited to, an electromagnetic compass or gyrocompass for detecting geomagnetism and an acceleration sensor.

The medium I/F 609 controls reading or writing (storing) of data from or to a storage medium 608 such as a flash memory. The GPS receiver 611 receives a GPS signal from a GPS satellite.

The smartphone 600 further includes a long-range communication circuit 612, a CMOS sensor 613, an imaging element I/F 614, a microphone 615, a speaker 616, an audio input/output I/F 617, a display 618, an external device connection I/F 619, a short-range communication circuit 620, an antenna 620a for the short-range communication circuit 620, and a touch panel 621.

The long-range communication circuit 612 is a circuit that enables the smartphone 600 to communicate with other devices through the network 40. The CMOS sensor 613 is an example of a built-in imaging device configured to capture an object under control of the CPU 601 to obtain image data. The imaging element IN 614 is a circuit that controls driving of the CMOS sensor 613. The microphone 615 is a built-in circuit that converts sound into an electric signal. The speaker 616 is a built-in circuit that generates sound such as music or voice by converting an electric signal into physical vibration.

The audio input/output I/F 617 is a circuit for inputting or outputting an audio signal between the microphone 615 and the speaker 616 under control of the CPU 601. The display 618 is an example of a display device configured to display an image of the object, various icons, etc. Examples of the display 618 include, but not limited to, a liquid crystal display (LCD) and an organic electroluminescence (EL) display.

The external device connection I/F 619 is an interface that connects the smartphone 600 to various external devices. The short-range communication circuit 620 is a communication circuit that communicates in compliance with the near field communication (NFC), the Bluetooth (Registered Trademark), and the like. The touch panel 621 is an example of an input device configured to enable a user to operate the smartphone 600 by touching a screen of the display 618.

The smartphone 600 further includes a bus line 610. Examples of the bus line 610 include, but not limited to, an address bus and a data bus, which electrically connects the components illustrated in FIG. 4 such as the CPU 601.

Projector

Figure 5:
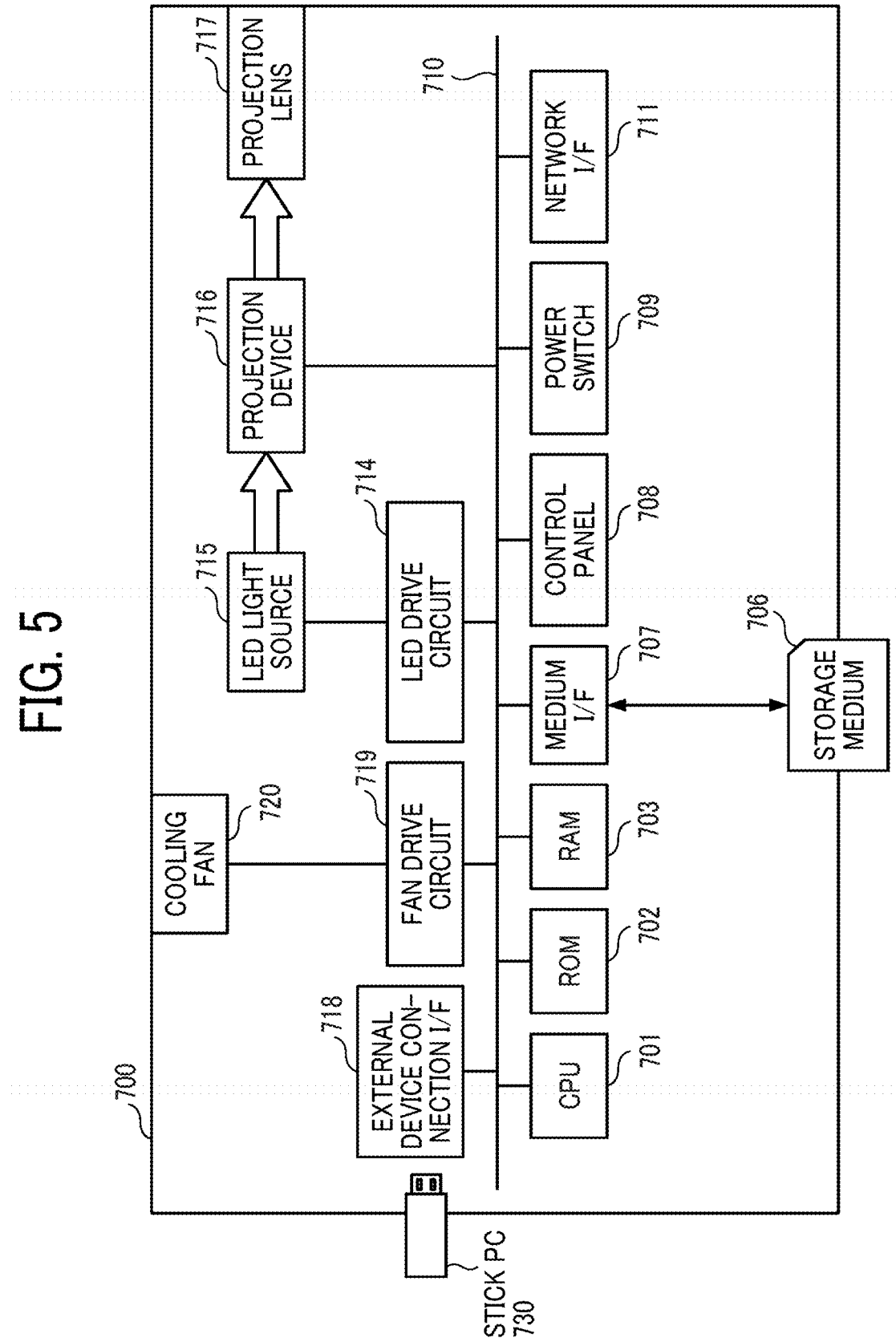
FIG. 5 is a block diagram illustrating an example of a hardware configuration of a projector, according to an embodiment of the present disclosure.

A projector 700, which is an example of the video display apparatus 12, is implemented by a hardware configuration as illustrated in FIG. 5, for example.

FIG. 5 is a block diagram illustrating an example of a hardware configuration of the projector 700, according to the present embodiment. As illustrated in FIG. 5, the projector 700 includes a CPU 701, a ROM 702, a RAM 703, a medium I/F 707, a control panel 708, a power switch 709, a bus line 710, a network I/F 711, a light emitting diode (LED) drive circuit 714, an LED light source 715, a projection device 716, a projection lens 717, an external device connection I/F 718, a fan drive circuit 719, and a cooling fan 720.

The CPU 701 controls entire operation of the projector 700. The ROM 702 stores a control program for controlling the CPU 701. The RAM 703 is used as a work area for the CPU 701. The medium I/F 707 controls reading or writing of data from or to a storage medium 706 such as a flash memory.

The control panel 708 is provided with various keys, buttons, LEDs, and the like, and is used for performing various operations other than controlling the power of the projector 700 by the user. For example, the control panel 708 receives an instruction operation such as an operation for adjusting the size of a projected image, an operation for adjusting a color tone, an operation for adjusting a focus, and an operation for adjusting a keystone, and outputs the received operation content to the CPU 701.

The power switch 709 is a switch for switching on or off the power of the projector 700. Examples of the bus line 710 include, but not limited to, an address bus and a data bus, which electrically connects the components illustrated in FIG. 5 such as the CPU 701. The network I/F 711 is an interface for performing data communication using the network 40 such as the Internet.

The LED drive circuit 714 controls turning on and off of the LED light source 715 under the control of the CPU 701. When turned on under the control of the LED drive circuit 714, the LED light source 715 emits projection light to the projection device 716. The projection device 716 transmits modulated light obtained by modulating the projection light from the LED light source 715 by the spatial light modulation method based on image data provided through the external device connection I/F 718 and the like, through the projection lens 717, whereby an image is projected on a projection surface of the screen. A liquid crystal panel or a digital micromirror device (DMD) is used as the projection device 716, for example.

The LED drive circuit 714, the LED light source 715, the projection device 716, and the projection lens 717 function as a projection unit that projects an image on the projection surface based on image data.

The external device connection I/F 718 is directly connected to a PC and acquires a control signal and image data from the PC. The external device connection I/F 718 is an interface circuit that connects the projector 700 to various external devices such as a stick PC 730. The fan drive circuit 719 is connected to the CPU 701 and the cooling fan 720 and drives or stops the cooling fan 720 based on a control signal from the CPU 701. The cooling fan 720 rotates to exhaust air inside the projector 700, whereby cooling the inside of the projector 700.

When the power is supplied, the CPU 701 starts up according to the control program stored in advance in the ROM 702, supplies a control signal to the LED drive circuit 714 to turn on the LED light source 715, and supplies a control signal to the fan drive circuit 719 to rotate the cooling fan 720 at a rated speed. Further, when supply of power from the power supply circuit is started, the projection device 716 enters an image displayable state, and power is supplied from the power supply circuit to various other components of the projector 700. When the power switch 709 of the projector 700 is turned off, a power-off signal is sent from the power switch 709 to the CPU 701.

In response to detection of the power-off signal, the CPU 701 supplies a control signal to the LED drive circuit 714 to turn off the LED light source 715. Then, when a predetermined time period elapses, the CPU 701 transmits a control signal to the fan drive circuit 719 to stop the cooling fan 720. Further, the CPU 701 terminates its own control processing, and finally transmits an instruction to the power supply circuit to stop supplying power.

Functional Configuration

Figure 6:
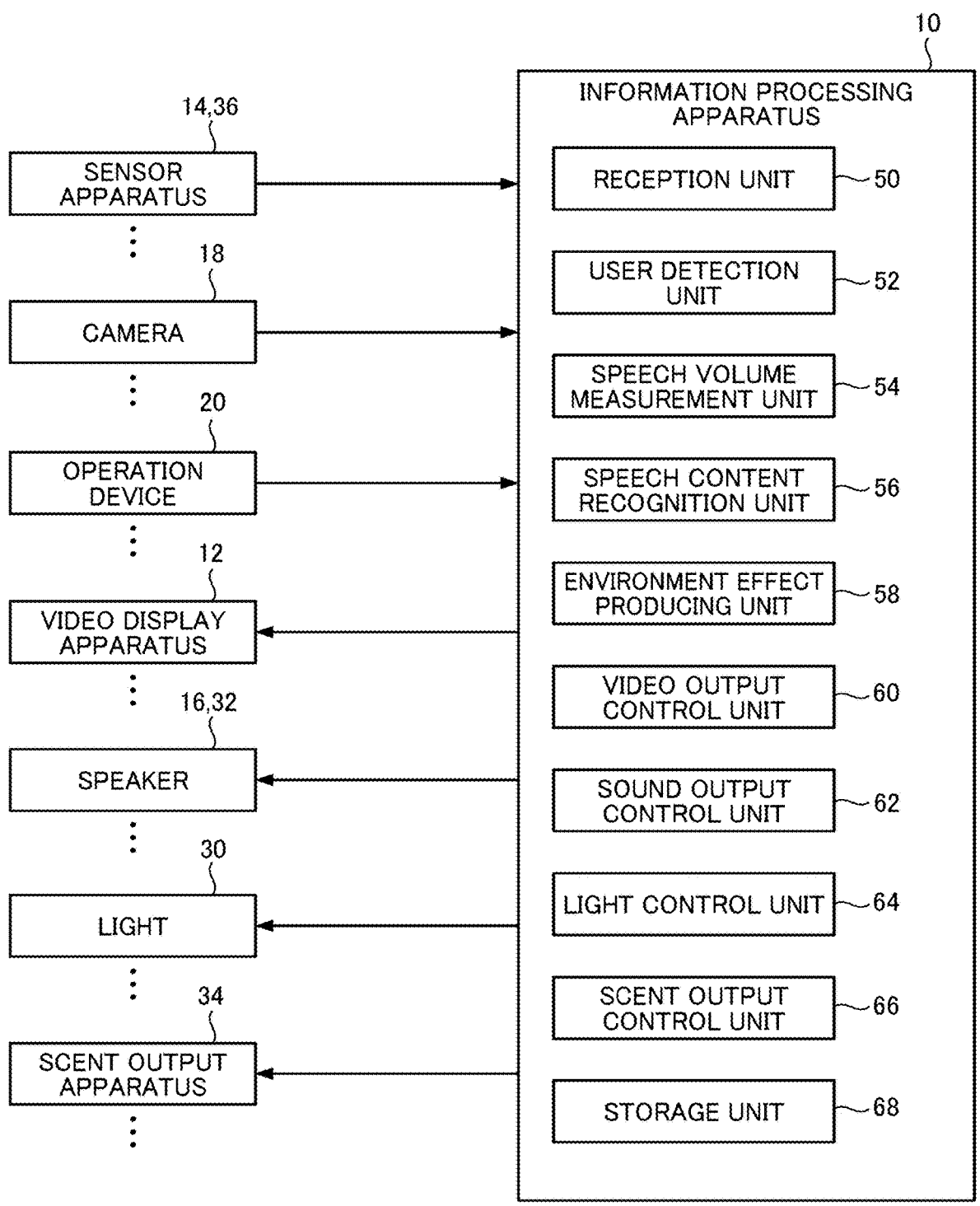
FIG. 6 is a block diagram illustrating an example of a functional configuration of an information processing apparatus, according to an embodiment of the present disclosure.

The information processing apparatus 10 according to the present embodiment is implemented by, for example, a functional configuration as illustrated in FIG. 6. FIG. 6 is a block diagram illustrating an example of a functional configuration of the information processing apparatus 10, according to the present embodiment. The functional configuration of FIG. 6 omits components unnecessary for the description of the present embodiment as appropriate.

The information processing apparatus 10 of FIG. 6 includes a reception unit 50, a user detection unit 52, a speech volume measurement unit 54, a speech content recognition unit 56, an environment effect producing unit 58, a video output control unit 60, a sound output control unit 62, a light control unit 64, a scent output control unit 66, and a storage unit 68.

The reception unit 50 receives from the sensor apparatus 14 and the sensor apparatus 36 signals for detecting the position information of a user. The reception unit 50 receives a result of the shooting a result of image capturing by the camera 18. Further, the reception unit 50 receives an output signal of a user's voice converted by the microphone 22 of the operation device 20 and an operation signal of the user's operation received by the operation key 26.

The user detection unit 52 detects position information of a user in the conference room or position information of a user walks through the approach based on the signal for detecting the position information of the user received from the sensor apparatus 14 or the sensor apparatus 36. The speech volume measurement unit 54 measures a volume of a speech of each user in the conference room based on the output signal of each user's voice received from the operation device 20.

The speech content recognition unit 56 performs speech recognition to recognize a content of a speech of each user in the conference room based on the output signal of each user's voice received from the operation device 20. The environment effect producing unit 58 determines an environment effect to be produced in the conference room (digital alcohol space) and an approach effect to be produced in the approach, based on the position information of each user detected by the user detection unit 52, the speech volume of each user detected by the speech volume measurement unit 54, and the content of the speech of each user recognized by the speech content recognition unit 56.

The environment effect producing unit 58 controls the video output control unit 60, the sound output control unit 62, the light control unit 64, and the scent output control unit 66, to perform the determined environment effect and approach effect. The video output control unit 60 controls the environment effect by video displayed by the video display apparatus 12 under control of the environment effect producing unit 58. The sound output control unit 62 controls the environmental effect and the approach effect by sound output by the speaker 16 and the speaker 32 under control of the environment effect producing unit 58. The light control unit 64 controls the approach effect by light output by the light 30 under control of the environment effect producing unit 58. The scent output control unit 66 controls the approach effect by scent output by the scent output apparatus 34 under control by the environment effect producing unit 58.

The storage unit 68 stores tables as illustrated in FIG. 7A to FIG. 7C, for example. FIG. 7A to FIG. 7C are illustrations of examples of data structures of tables used in the information processing system, according to the present embodiment. The table format as illustrated in FIG. 7A to 7C is just one example. Data can be stored and managed in any other suitable ways, provided that the stored and managed data is the same or substantially the same as the data illustrated in FIG. 7A to 7C.

FIG. 7A is an illustration of an example of data structure of data stored in a video display apparatus information storage unit. The video display device information management storage unit stores, as items, a wall projection range information and a floor projection range information in association with a video display apparatus identifier (ID). The video display apparatus ID is an example of identification information identifying the video display apparatus 12. The wall projection range information is information indicating which range of which wall in the conference room is projected by the associated video display apparatus 12. The floor projection range information is information indicating which range of the floor in the conference room is projected by the associated video display apparatus 12. Further, in a case in which the video display apparatus 12 is a projector, at least one of the wall projection range information and the floor projection range information is associated with the video display apparatus ID.

Furthermore, in a case in which the video display apparatus 12 is a display, the video display apparatus information storage unit stores a wall display range and a floor display range in association with the video display apparatus ID. The wall display range information is information indicating that each display provided in the conference room displays video on which range of which wall. The floor display range information is information indicating that each display provided in the conference room displays video on which range of which floor. Further, in a case in which the video display apparatus 12 is a display, at least one of the wall display range information and the floor display range information is associated with the video display apparatus ID.

FIG. 7B is an illustration of an example of data structure of data stored in a user information storage unit. The user information storage unit stores, as items, a user ID, a tag ID, position information, and a speech state information. The user ID is an example of identification information identifying a user. The tag ID is an example of identification information identifying the tag 24 of the operation device 20. The position information is position information of a detected user.

The speech state information is information for distinguishing a user who is currently speaking and a user who is in a state other than speaking described below. The value "True" of the speech state information indicates the user who is currently speaking described below. The value "False" of the speech state information indicates the user who is in a state other than speaking described below. Since the position information is updated every time the position information of the user is detected, the latest position information in the space is stored in association with the user ID.

FIG. 7C is an illustration of an example of data structure of data stored in a log storage unit. The log storage unit stores the user information illustrated in FIG. 7B as log information from the start to the end of a meeting. The log storage unit stores, as items, a date and time, the user ID, the tag ID, the position information, the speech state information, and a speech volume information. The speech volume information indicates a speech volume measured by the speech volume measurement unit 54. Although in an example illustrated in FIG. 7C, the speech volume is indicated by a level, the speech volume can be indicated in any other suitable way including a numerical value such as a measured value.

Further, for example, data stored in the log storage unit illustrated in FIG. 7C indicates that "User A" and "User B" have already participated at "17:00" and "User C" has participated late at "17:01".

Operation

Figure 8:
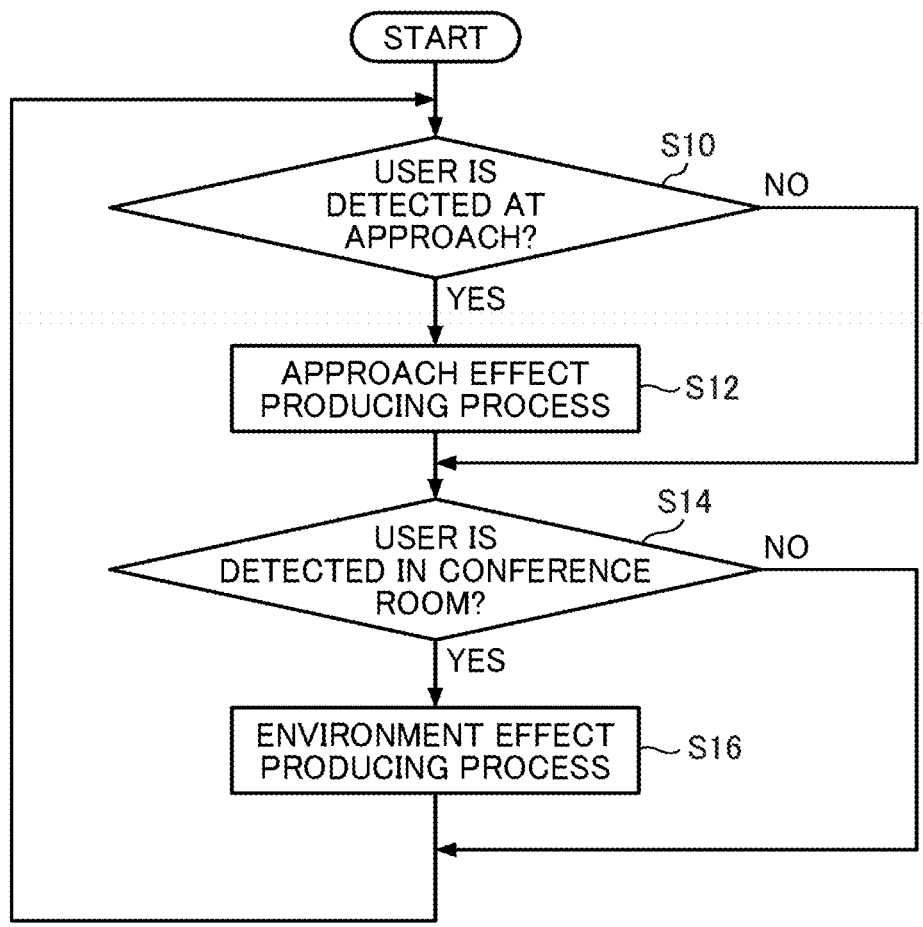
FIG. 8 is a flowchart illustrating an example of operation performed by the information processing system, according to an embodiment of the present disclosure.

The information processing system 1 according to the present embodiment implements the digital alcohol space according to an operation as illustrated in FIG. 8, for example. FIG. 8 is a flowchart illustrating an example of operation performed by the information processing system, according to the present embodiment.

When the information processing system 1 according to the present embodiment detects a user passing through the approach in step S10, the operation proceeds to step S12. In step S12, the environment effect producing unit 58 controls the light control unit 64, the sound output control unit 62, and the scent output control unit 66, respectively, to perform approach effect producing process that resets the user's feelings with light, sound, and scent by the light 30, the speaker 32, and the scent output apparatus 34, which are provided in the approach. Examples of the approach effect producing process include, but not limited to, an effect producing process of reducing the amount of light of the light 30 in the approach, an effect producing process of outputting ambient music having a relaxing effect by the speaker 32, an effect producing process of outputting a relaxing scent by the scent output apparatus 34. Further, for example, in the approach effect producing process, a user is identified in a passage through which the user enters or exits the digital alcohol space, to change the approach effect producing process to be performed according to the identified user. In this case, user information associating the user ID with a content of the approach effect producing process is stored in advance. Thereby, the approach effect producing process to be performed is determined based on the user ID of the identified user and the stored user information, to perform different approach effect producing processes depending on users. Note that it is sufficient that the approach effect producing process includes at least one effect producing process using at least one of light, sound, and scent, and controls at least one of the light 30 in the approach, the speaker 32, and the scent output apparatus 34.

When the information processing system 1 according to the present embodiment detects a user in the conference room in step S14, the operation proceeds to step S16. In step S16, the information processing system 1 controls the video display apparatus 12 and the speaker 16 in the conference room, to perform an environment effect producing process as described below using videos and sounds. Examples of the environment effect producing process include, but not limited to, a spotlight processing to a user who is currently speaking, a spotlight processing according to a distance between users, a sound output processing according to a distance between users, and the like, which are described below.

Hereinafter, a description is given of, as an example of the environment effect producing process using videos and sounds, a spotlight processing to a user who is currently speaking, a spotlight processing according to a distance between users, a sound output processing according to a distance between users, and a report processing. The environment effect producing process according to the present embodiment is not limited to the above processing examples.

For example, the environment effect producing process may be any suitable process that identifies a state of a team of users in the conference room based on information representing states of the users in the conference room, such as signals transmitted from the sensor apparatus 14, to cause the state of the team to transition in an appropriate state.

Spotlight Processing to User Who is Currently Speaking

Figure 9:
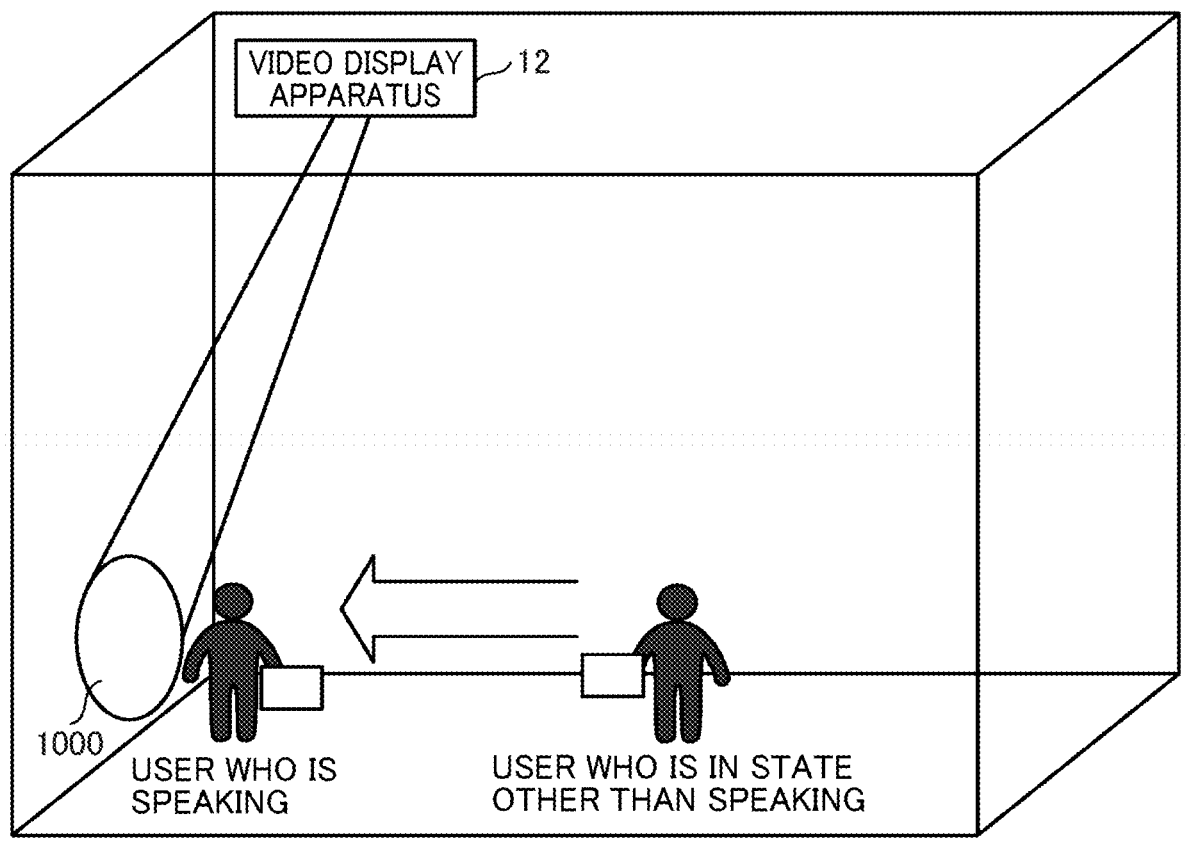
FIG. 9 is an illustration of an example of spotlight processing to a user who is currently speaking, according to an embodiment of the present disclosure.
Figure 10:
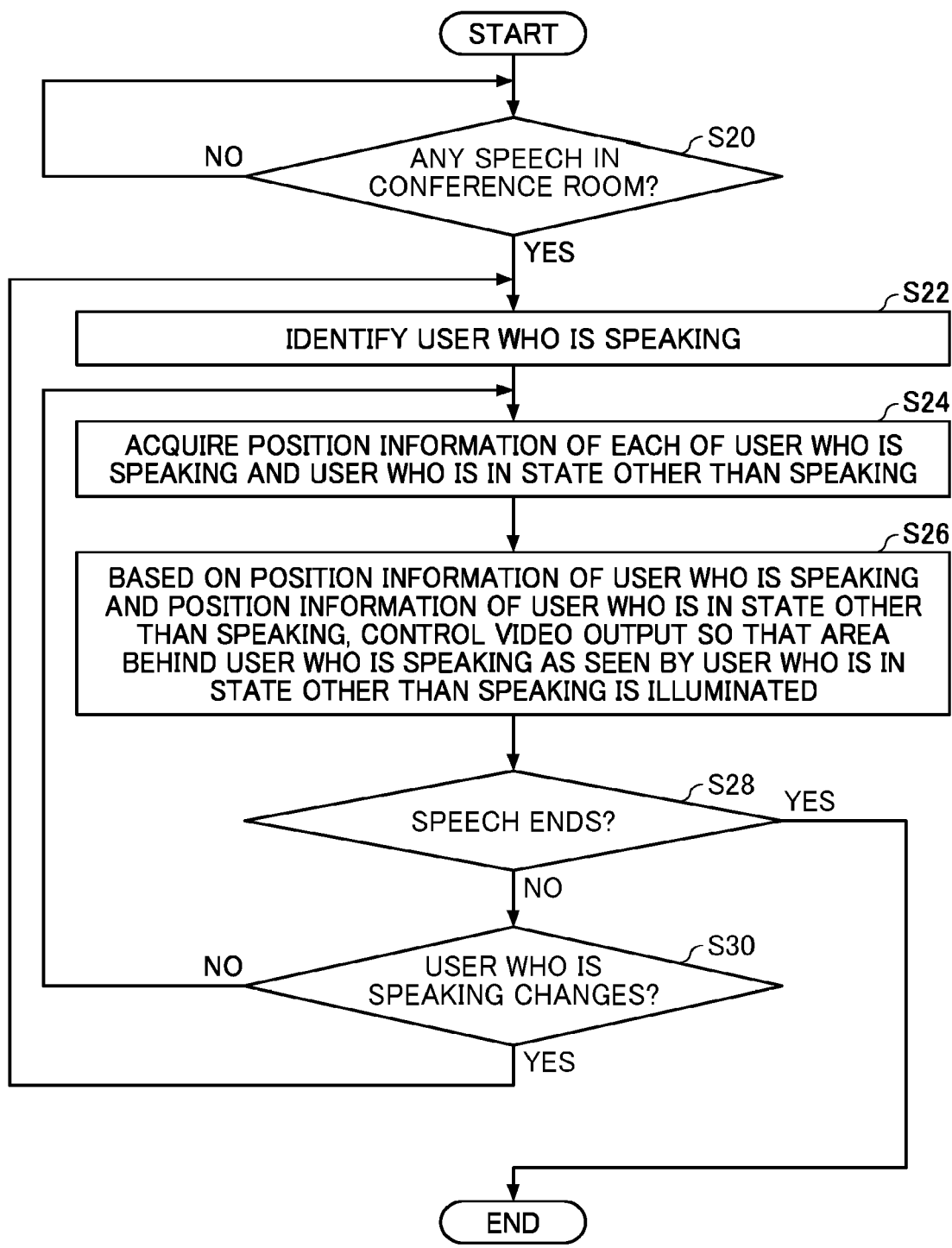
FIG. 10 is a flowchart illustrating an example of steps in the spotlight processing to the user who is currently speaking, according to an embodiment of the present disclosure.

A description is now given of an example of the spotlight processing to a user who is currently speaking, with reference to FIG. 9 and FIG. 10. FIG. 9 is an illustration of an example of the spotlight processing to a user who is currently speaking. FIG. 10 is a flowchart illustrating an example of steps in the spotlight processing to the user who is currently speaking.

For example, as illustrated in FIG. 9, the spotlight processing to the user who is currently speaking is classifying plural users in the conference room into a user who is currently speaking and a user who is in a state other than speaking, and shining a spotlight on an area 1000 on a wall that is behind the user who is currently speaking as viewed from the user who is in a state other than speaking. For example, the spotlight processing makes the area 1000 brighter than an area other than the area 1000. Alternatively, the spotlight processing makes a color of the area 1000 to stand out compared with a color of an area other than the area 1000. In another example, the spotlight processing to the user who is currently speaking shines a spotlight on an area of the feet of the user who is currently speaking.

In the conference room where the environment effect is produced as illustrated in FIG. 9, since the user who is in a state in a state other than speaking and the user who currently is speaking are visually distinguished, it is expected that the user who is in a state other than speaking pays attention to the user who is currently speaking. Note that in FIG. 9, a single video display apparatus 12 of the plurality of video display apparatuses 12 configured to project videos on the walls or floor of the conference room is illustrated, and the other video display apparatuses 12 are omitted, in order to simplify the drawing.

For example, when there are plural users who are in states other than speaking, a spotlight is shined on each of areas 1000 on the wall behind the user who is currently speaking user as viewed from each of the plural user who are in states other than speaking. In another example, a spotlight is shined on a selected one or more of the areas 1000.

Further, for example, when there are plural video display apparatuses 12 each being configured to shine a spotlight on the area 1000, each of the plural video display apparatuses 12 shine a spotlight to the area 1000. In another example, the video display apparatus 12 that is to shine a spotlight on the area 1000 is selected according to a priority level.

The spotlight processing illustrated in FIG. 9 is implemented by, for example, an operation as illustrated in FIG. 10. When the speech volume measurement unit 54 measures a speech volume of a user in the conference room in step S20, the operation by the environment effect producing unit 58 proceeds to step S22. In step S22, the environment effect producing unit 58 identifies a user who is currently speaking based on the user's speech volume measured by the speech volume measurement unit 54. When the number of users whose speech volume are measured is one, the corresponding user whose speech volume is measure is identified as the user who is currently speaking. When the number of users whose speech volume are measured are plural, a particular user is identified as the user who is currently speaking from among the plural users whose speech volume are measured, based on a predetermined logic. Examples of the predetermined logic includes, but not limited to, a logic according to which a user whose measured speech volume is largest is identified as the user who is currently speaking, and a logic according to which a user whose user ID is associated with the highest priority level is identified as the user who is currently speaking.

In step S24, the environment effect producing unit 58 acquires the position information of the user who is currently speaking and the user who is in a state other than speaking from the user information storage unit illustrated in FIG. 7B, for example. In step S26, the environment effect producing unit 58 controls the video output control unit 60 so that the area 1000 behind the user who is currently speaking as viewed from the user who is in a state other than speaking is illuminated by the video display apparatus 12, based on the position information of the user who is currently speaking and the position information of the user who is in a state other than speaking. In a case in which the video display apparatus 12 is a display, the environment effect producing unit 58 controls the video output control unit 60 so that a display content displayed by the display is brightened. Note that the entire display content is not necessarily brightened, and it is sufficient that at least a part of the displayed content is controlled to be brightened.

The environment effect producing unit 58 repeats the processes from steps S24 to S30 until the speech by the users in the conference room ends or the user who is currently speaking changes. When the speaker who is currently speaking changes, the operation returns to step S22, and the environment effect producing unit 58 identifies the user who is currently speaking, and then repeats the processes from steps S24 to S30. Further, when the speech by the users in the conference room ends, the environment effect producing unit 58 ends the operation of the flowchart of FIG. 10.

Spotlight Processing According to Distance Between Users

Figure 11:
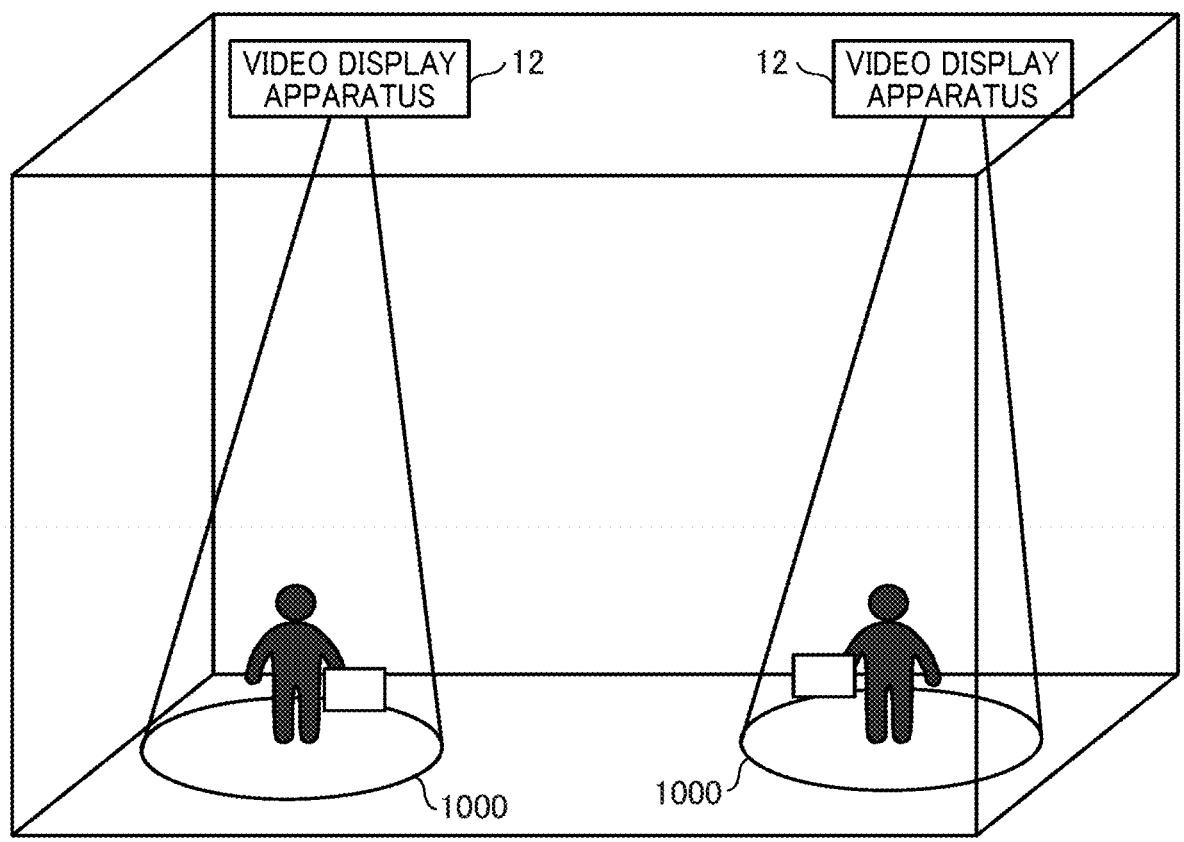
FIG. 11 is an illustration of an example of the spotlight processing according to a distance between users, according to an embodiment of the present disclosure.
Figure 12A:
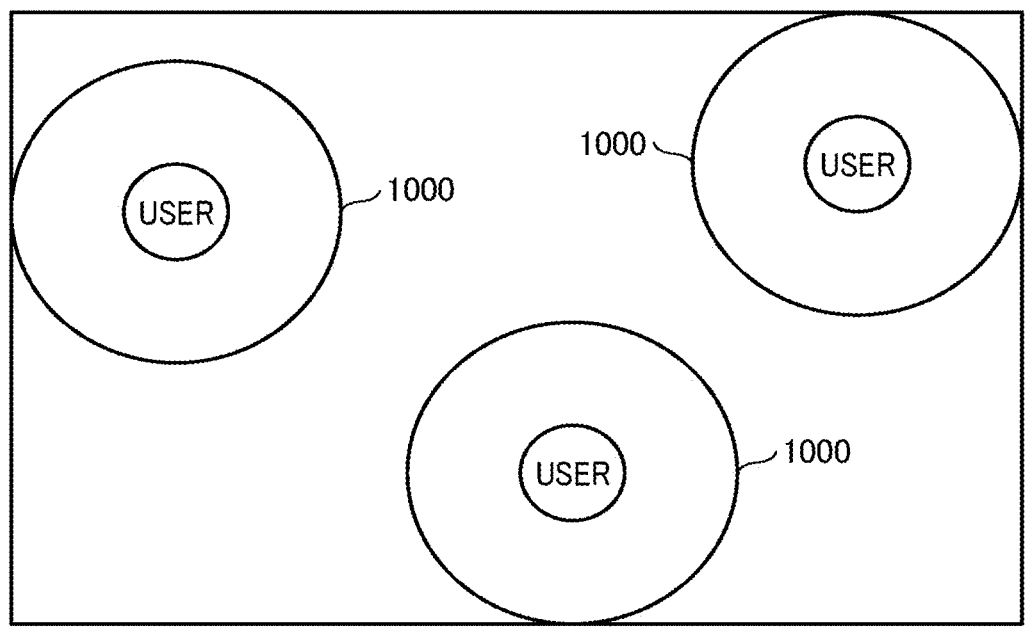
FIGS. 12A and 12B are illustrations of specific examples of the spotlight processing according to a distance between users, according to an embodiment of the present disclosure.
Figure 12B:
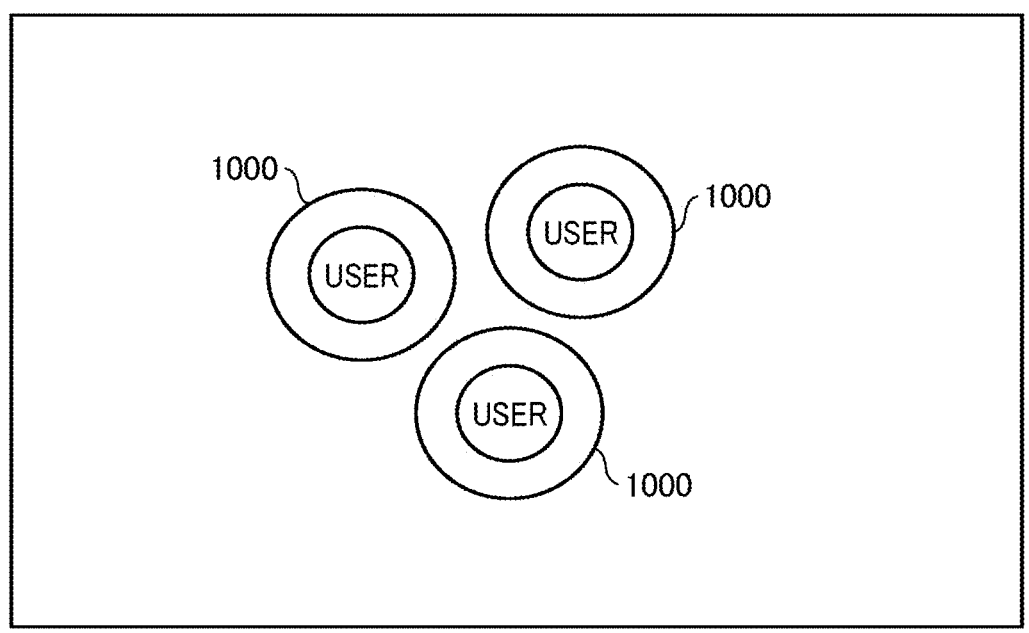

A description is now given of an example of the spotlight processing according to a distance between users, with reference to FIG. 11 to FIG. 13. FIG. 11 is an illustration of an example of the spotlight processing according to a distance between users. FIG. 12A and FIG. 12B are illustrations of specific examples of the spotlight processing according to a distance between users. FIG. 13 is a flowchart illustrating an example of steps in the spotlight processing according to a distance between users.

The spotlight processing according to a distance between users is a processing of changing the size of the area 1000 on which a spotlight is to be shined at the feet of the users based on a distance between plural users in the conference room as illustrated in FIG. 11, for example. For example, the spotlight processing makes the area 1000 brighter than an area other than the area 1000. Alternatively, the spotlight processing makes a color of the area 1000 to stand out compared with a color of an area other than the area 1000.

The processing of changing the size of the area 1000 on which a spotlight is to be shined at the feet of the users based on the distance between plural users in the conference room is a processing of controlling the video output control unit 60 so that the longer the distance between the users, the larger the area 1000, for example, as illustrated in FIG. 12A. Further, the processing of changing the size of the area 1000 on which a spotlight is to be shined at the feet of the users based on the distance between plural users in the conference room is a processing of controlling the video output control unit 60 so that the shorter the distance between the users, the smaller the area 1000, for example, as illustrated in FIG. 12B.

Note that the embodiment is not limited to the examples of FIG. 12A and FIG. 12B. In another example, the environment effect producing unit 58 controls the video output control unit 60 so that the longer the distance between the users, the smaller the area 1000. In still another example, the environment effect producing unit 58 controls the video output control unit 60 so that the shorter the distance between the users, the larger the area 1000.

The spotlight processing illustrated in FIG. 11, FIG. 12A, and FIG. 12B is implemented by, for example, an operation as illustrated in FIG. 13. When the user detection unit 52 detects plural users in the conference room in step S40, the operation by the environment effect producing unit 58 proceeds to step S42.

In step S42, the environment effect producing unit 58 acquires position information of the detected plural users from the user information storage unit of FIG. 7B, for example. In step S44, the environment effect producing unit 58 calculates a distance between the plural users in the conference room from the acquired position information of the detected plural users.

In step S46, the environment effect producing unit 58 controls the video output control unit 60 to change the size of the area 1000 that illuminates the user's feet based on the calculated distance between the plural users, for example, as illustrated in FIG. 12A and FIG. 12B. The environment effect producing unit 58 repeats the processes from steps S42 to S48 until the meeting ends. When any users are no longer detected and the meeting ends, the operation by the environment effect producing unit 58 illustrated in the flowchart of FIG. 13 ends.

Figure 14:
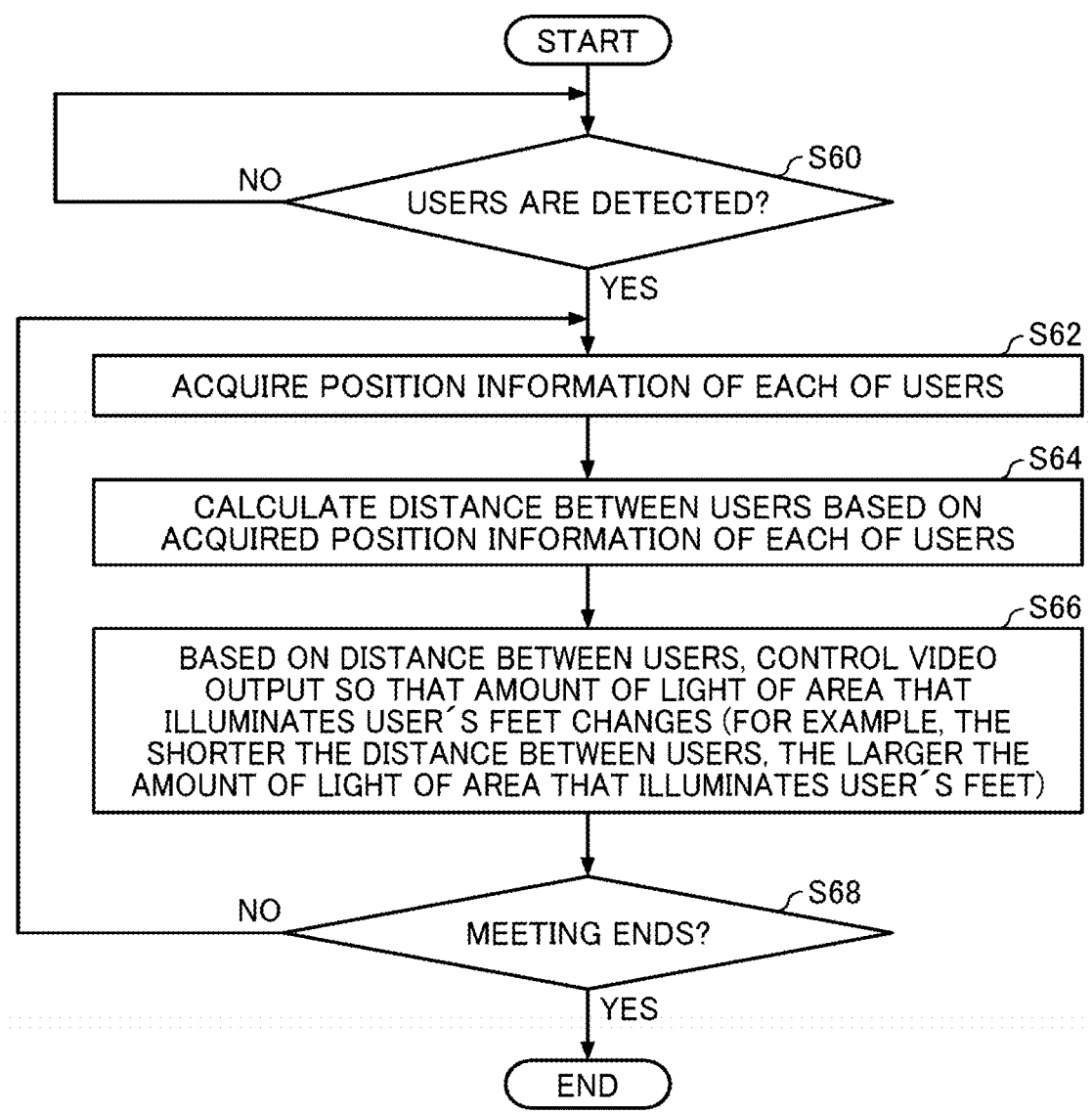
FIG. 14 is a flowchart illustrating another example of steps in the spotlight processing according to a distance between users, according to an embodiment of the present disclosure.

FIG. 14 is a flowchart illustrating another example of steps in the spotlight processing according to a distance between users. The spotlight processing according to a distance between users illustrated in FIG. 14 is a processing of changing the amount of light in the area 1000 that illuminates a user's feet based on a distance between plural users in the conference room.

The processing of changing the amount of light in the area 1000 that illuminates the user's feet based on the distance between plural users in the conference room is a processing of controlling the video output control unit 60 so that the longer the distance between users, the smaller the amount of light in the area 1000, and the shorter the distance between users, the larger the amount of light in the area 1000.

In another example, the processing of changing the amount of light in the area 1000 that illuminates the user's feet based on the distance between plural users in the conference room is a processing of controlling the video output control unit 60 so that the longer the distance between users, the larger the amount of light in the area 1000, and the shorter the distance between users, the smaller the amount of light in the area 1000.

When the user detection unit 52 detects plural users in the conference room in step S60, the operation by the environment effect producing unit 58 proceeds to step S62. In step S62, the environment effect producing unit 58 acquires position information of the detected plural users from the user information storage unit of FIG. 7B, for example. In step S64, the environment effect producing unit 58 calculates a distance between the plural users in the conference room from the acquired position information of the detected plural users.

In step S66, the environment effect producing unit 58 controls the video output control unit 60 so that the amount of light in the area 1000 that illuminates the user's feet varies based on the calculated distance between the plural users. The environment effect producing unit 58 repeats the processes from steps S62 to S68 until the meeting ends. When any users are no longer detected and the meeting ends, the operation by the environment effect producing unit 58 illustrated in the flowchart of FIG. 14 ends.

Sound Output Processing According to Distance Between Users

Figure 15:
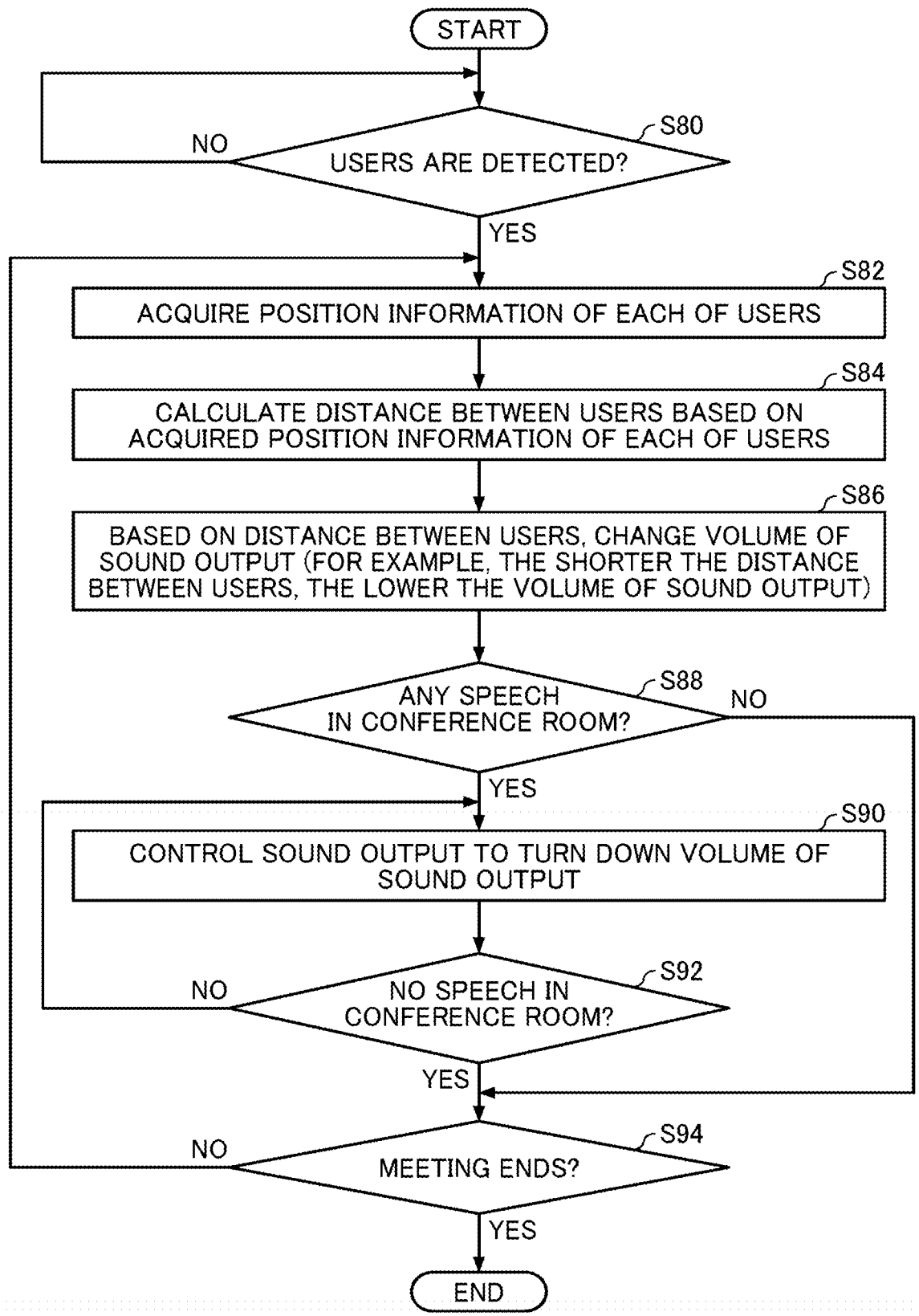
FIG. 15 is a flowchart illustrating an example of steps in sound output processing according to a distance between users, according to an embodiment of the present disclosure.

A description is now given of an example of the sound output processing according to a distance between users. FIG. 15 is a flowchart illustrating an example of steps in the sound output processing according to a distance between users. The sound output processing according to a distance between users illustrated in FIG. 15 is a processing of changing the volume of sound output to the conference room based on a distance between plural users in the conference room.

The processing of changing the volume of sound output to the conference room based on the distance between plural users in the conference room is a processing of controlling the sound output control unit 62 so that the longer the distance between users, the higher the volume of the sound output, and the shorter the distance between users, the lower the volume of the sound output.

In another example, the processing of changing the volume of sound output to the conference room based on the distance between plural users in the conference room is a processing of controlling the sound output control unit 62 so that the longer the distance between users, the lower the volume of the sound output, and the shorter the distance between users, the higher the volume of the sound output.

When the user detection unit 52 detects plural users in the conference room in step S80, the operation by the environment effect producing unit 58 proceeds to step S82. In step S82, the environment effect producing unit 58 acquires position information of the detected plural users from the user information storage unit of FIG. 7B, for example. In step S84, the environment effect producing unit 58 calculates a distance between the plural users in the conference room from the acquired position information of the detected plural users.

In step S86, the environment effect producing unit 58 controls the sound output control unit 62 so that the volume of sound output from the speaker 16 in the conference room varies based on the calculated distance between the plural users. The environment effect producing unit 58 repeats the processes from steps S82 to S94 until a speech by any user in the conference room is detected or the meeting ends.

When a speech by any user in the conference room is detected, the operation proceeds to step S90. In step S90, the environment effect producing unit 58 controls the sound output control unit 62 so as to reduce the volume of the sound output, and maintains the state in which the volume of the sound output is reduced until a speech by any user in the conference room is no longer detected. When no speech by the users in the conference room is detected, the volume returns to the sound output volume set in step S86. When any users are no longer detected and the meeting ends, the operation by the environment effect producing unit 58 illustrated in the flowchart of FIG. 15 ends.

Report Processing

Figure 16:
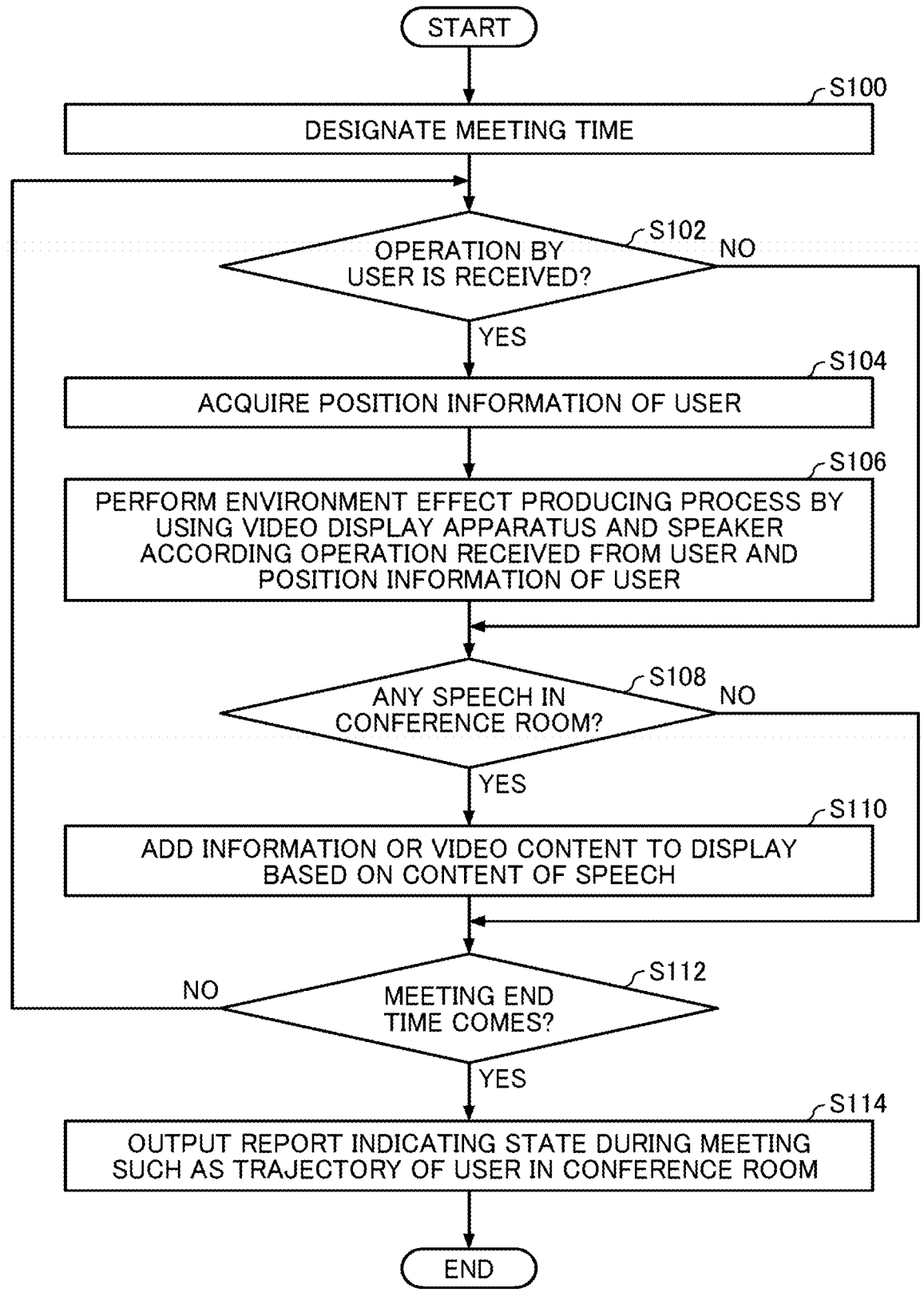
FIG. 16 is a flowchart illustrating an example of steps in outputting a report performed by the information processing system, according to an embodiment of the present disclosure.

A description is now given of an example of the report processing of producing an environment effect according to an operation received from a user and position information of a user and outputting a report after a meeting ends. FIG. 16 is a flowchart illustrating an example of steps in outputting a report performed by the information processing system, according to the present embodiment.

In step S100, the environment effect producing unit 58 receives a designation of a meeting time (activity time) from a user and starts a meeting. The environment effect producing unit 58 repeats the processes of steps S102 to S112 until the environment effect producing unit receives an operation from a user, or detects a speech by any other in the conference room.

In response to receiving an operation from a user, the operation by the environment effect producing unit 58 proceeds to step S104. In step S104, the environment effect producing unit 58 acquires position information of the user information storage unit of FIG. 7B, for example. In step S106, the environment effect producing unit 58 produces an environment effect by the video display apparatus 12 and the speaker 16 according to the operation received from the user and the position information of the user.

For example, in step S106, the environment effect producing unit 58 projects information and video contents on the walls and floor of the digital alcohol space, selects at least a part of information and video contents projected on the walls and floor, and moves, enlarge or reduce the selected information and video contents, based on the operation received from the user and the position information of the user.

Further, when the environment effect producing unit 58 detects a speech by any user in the conference room is detected, the operation proceeds to step S110. In step S110, the environment effect producing unit 58 adds information and video contents to the information and video contents that are already projected onto the walls and floor of the digital alcohol space, according to the user's speech content obtained by performing speech recognition on the user's voice output signal received from the operation device 20.

The information and video contents that are additionally projected on the walls and floor of the digital alcohol space in step S110 does not necessarily have to be the information and video contents according to the user's speech content. In another example, the information and video contents that are additionally projected on the walls and floor of the digital alcohol space in step S110 is random information and video contents. By adding random information and video contents to the information and video contents that is already projected onto the walls and floor of the digital alcohol space, the environment effect producing unit 58 can control the concentration and variation of thoughts of users attending the meeting.

Further, even when the same information and video contents are produced, the information processing system 1 according to the present embodiment performs a feedback in which the additionally projected information and video contents vary depending on the walls and floor of the digital alcohol space (e.g., a right-brain display or left-brain display), to control the concentration and variation of thoughts of users attending the meeting.

When any users are no longer detected and the meeting ends, the operation by the environment effect producing unit 58 proceeds to step S114. In step S114, the environment effect producing unit 58 output a report indicating a state during the meeting such as a movement trajectory of the users in the conference room. For example, when outputting the report indicating the movement trajectory of the users in the conference room, the environment effect producing unit 58 refers to the information in the log storage unit of FIG. 7C, to perform drawing processing that maps each user's position information from the start to the end of the meeting as a trajectory on image data or video data of a space in which the users communicated with each other. Thereby, the environment effect producing unit 58 creates image data or video data that visualizes the movement trajectories of the users. The image data or video data of the space may be data captured by the camera 18 provided in the space, or may be image data or video data stored in advance. Thus, the environment effect producing unit 58 outputs the created image data or video data as the report.

In another example, in a case in which the environment effect producing unit 58 refers to a speech state stored in the log storage unit, to perform drawing processing of drawing a trajectory indicating the position information of a user corresponding to a date and time when the user is a state of speaking, the environment effect producing unit draws such trajectory in a different color or shape different from a trajectory indicating the position information of the user corresponding to a date and time when the user is in a state other than speaking. In still another example, the environment effect producing unit 58 performs drawing processing of drawing a trajectory in a different color or shape according to the measured volume of speech, in substantially the same manner.

By referring to such report, one can recognize how much communication between a plurality of users is activated by the environment effect production.

According to one or more embodiments of the present disclosure, effective presentations are made to support the communication between plural users in the same space.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. The information processing system 1 described in the above embodiments is just an example, and there may be various system configurations depending on applications or purposes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The apparatuses or devices described in one or more embodiments are just one example of plural computing environments that implement the one or more embodiments disclosed herein. In some embodiments, the information processing apparatus 10 includes multiple computing devices, such as a server cluster. The multiple computing devices are configured to communicate with one another through any type of communication link, including the network 40, a shared memory, etc., and perform the processes disclosed herein.

Further, the information processing apparatus 10 can also combine disclosed processing steps in various ways. The components of the information processing apparatus 10 may be combined into a single apparatus or may be divided into a plurality of apparatuses.

What is claimed is:

1. An information processing system comprising:
an image display apparatus provided in a space and configured to display an image;
a tag device carried by a user who is present in the space and configured to output a signal for detecting position information of the user in the space; and
an information processing apparatus communicably connected to the image display apparatus and the tag device,
the information processing apparatus including circuitry configured to
store a plurality of pieces of position information of a plurality of users including the user, who are present in the space, in association with the plurality of users, the plurality of users being detected based on signals output from a plurality of tag devices including the tag device, each being carried by each of the plurality of users,
produce an environment effect in the space that supports communication between the plurality of users by the image displayed by the image display apparatus, based on each of the plurality of pieces of position information of the plurality of users,
identify a particular user who is currently speaking from among the plurality of users, and
wherein the produced environment effect in the space is that the particular user who is currently speaking and a user who is in a state other than speaking are visually distinguished by light in the space.

2. The information processing system of claim 1, wherein the circuitry is further configured to
measure a volume of a speech by each of the plurality of users, based on an output signal from a microphone, wherein the particular user who is currently speaking from among the plurality of users is identified based on a result of the measured volume of the speech.

3. The information processing system of claim 2, wherein the circuitry controls the environment effect production so that an area behind the particular user who is currently speaking as viewed from the user who is in the state other than speaking is set brighter than other areas.

4. The information processing system of claim 2, wherein the circuitry is further configured to perform speech recognition to recognize a content of a speech by each of the plurality of users based on an output signal from the microphone, and control the environment effect production according to the content of the speech by each of the plurality of users based on a result of the speech recognition.

5. The information processing system of claim 2, wherein the circuitry stores a change in the position information of each of the plurality of users who are present in the space as log information, and the circuitry outputs a report according to a trajectory of the position information of each of the plurality of users who are present in the space, based on the log information.

6. The information processing system of claim 1, wherein the circuitry controls at least one of a size or an amount of light of the image displayed by the image display apparatus according to a distance between the plurality of users, the distance being calculated based on the position information of each of the plurality of users.

7. The information processing system of claim 6, wherein the circuitry is further configured to output sound to the plurality of users from a speaker, and control a sound effect of the sound according to the distance between the plurality of users.

8. The information processing system of claim 1, wherein the circuitry stores the plurality of pieces of position information of the plurality of users who are present in the space in association with the plurality of users respectively, based on a radio wave received from an operation device carried by each of the plurality of users.

9. The information processing system of claim 1, wherein the circuitry changes the environment effect production according to the image displayed by the image display apparatus on one or more faces defining the space.

10. The information processing system of claim 1, wherein the circuitry is further configured to perform speech recognition to recognize a content of a speech by each of the plurality of users based on an output signal from a microphone, and control the environment effect production according to the content of the speech by each of the plurality of users based on a result of the speech recognition.

11. The information processing system of claim 1, wherein the circuitry stores a change in the position information of each of the plurality of users who are present in the space as log information, and the circuitry outputs a report according to a trajectory of the position information of each of the plurality of users who are present in the space, based on the log information.

12. An information processing apparatus that is communicably connected with an image display apparatus provided in a space and configured to display an image and a tag device carried by a user who is present in the space and configured to output a signal for detecting position information of the user, the information processing apparatus comprising circuitry configured to store a plurality of pieces of position information of a plurality of users including the user, who are present in the space, in association with the plurality of users, the plurality of users being detected based on signals output from a plurality of tag devices including the tag device, each being carried by each of the plurality of users, produce an environment effect in the space that supports communication between the plurality of users by the image displayed by the image display apparatus, based on each of the plurality of pieces of position information of the plurality of users, and identify a particular user who is currently speaking from among the plurality of users, wherein the produced environment effect in the space is that the particular user who is currently speaking and a user who is in a state other than speaking are visually distinguished by light in the space.

13. An information processing method performed by an information processing apparatus that is communicably connected with an image display apparatus provided in a space and configured to display an image and a tag device carried by a user who is present in the space and configured to output a signal for detecting position information of the user, the information processing method comprising:

storing a plurality of pieces of position information of a plurality of users including the user, who are present in the space, in association with the plurality of users, the plurality of users being detected based on signals output from a plurality of tag devices including the tag device, each being carried by each of the plurality of users;

producing an environment effect in the space that supports communication between the plurality of users by the image displayed by the image display apparatus, based on each of the plurality of pieces of position information of the plurality of users; and identifying a particular user who is currently speaking from among the plurality of users, wherein the produced environment effect in the space is that the particular user who is currently speaking and a user who is in a state other than speaking are visually distinguished by light in the space.

14. A room comprising the information processing system of claim 1.

15. The information processing system of claim 1, wherein the circuitry stores the plurality of pieces of position information of the plurality of users who are present in the space in association with the plurality of users respectively, based on a radio wave received from an operation device carried by each of the plurality of users, and the circuitry changes the environment effect production according to the image displayed by the image display apparatus on one or more faces defining the space.

* * * * *